United States Patent [19]

Komatsubara et al.

[11] Patent Number: 4,519,678

[45] Date of Patent: May 28, 1985

[54] LIQUID CRYSTAL DISPLAY DEVICE

[75] Inventors: Yoshiaki Komatsubara, Yokohama; Kyozoh Ide, Fujisawa; Eiko Munakata, Yokohama, all of Japan

[73] Assignee: Tokyo Shibaura Denki Kabushiki Kaisha, Kawasaki, Japan

[21] Appl. No.: 454,708

[22] Filed: Dec. 30, 1982

[30] Foreign Application Priority Data

Jan. 21, 1982 [JP] Japan .................................. 57-7923

[51] Int. Cl.³ .............................................. G02F 1/13
[52] U.S. Cl. ................................. 350/338; 350/339 R; 350/339 D; 350/320
[58] Field of Search ............... 350/339 R, 339 D, 338

[56] References Cited

U.S. PATENT DOCUMENTS

| | | |
|---|---|---|
| 3,960,438 | 6/1976 | Bonne . |
| 4,106,859 | 8/1978 | Doriguzzi et al. .................. 350/338 |
| 4,217,035 | 8/1980 | Doriguzzi . |
| 4,431,272 | 2/1984 | Yazawa et al. ................. 350/338 X |

FOREIGN PATENT DOCUMENTS

| | | |
|---|---|---|
| 2933312 | 3/1980 | Fed. Rep. of Germany . |
| 5589306 | 6/1977 | Switzerland . |
| 1434906 | 5/1976 | United Kingdom ................ 350/338 |
| 2064805 | 6/1981 | United Kingdom . |
| 2066545 | 7/1981 | United Kingdom . |

Primary Examiner—John K. Corbin
Assistant Examiner—Richard Gallivan
Attorney, Agent, or Firm—Oblon, Fisher, Spivak, McClelland & Maier

[57] ABSTRACT

A reflective type liquid crystal display device and a method of manufacturing the same. The liquid crystal display device comprises a transparent first substrate, a second substrate, a reflective metal film and liquid crystal filled in a gap between the first substrate and the reflective metal film. The reflective metal film is formed on a polymer resin layer which is coated on the second substrate. The polymer resin layer has in one surface small protrusions or depressions having a gently curved profile. The reflective metal film formed on the surface of the polymer resin layer and has small protrusions or depressions having a gently curved profile. The liquid crystal display device can thus display a bright picture with high contrast.

11 Claims, 13 Drawing Figures

LIQUID CRYSTAL DISPLAY DEVICE

BACKGROUND OF THE INVENTION

The present invention relates to a reflective type liquid crystal display device and a method of manufacturing the same, and more particularly, to an improvement on a reflective part of a reflective type liquid crystal display device.

Recent years have seen a rapid progress of display devices. Of the display devices hitherto known, a liquid crystal display device is advantageous in several respects. First, it consumes a little electric power. Second, it is thin. Third, it has a long life. Very recently, television sets have been made using liquid crystal displays.

Most liquid crystal television sets use a so-called Guest-Host type liquid crystal, a mixture of nematic liquid crystal and dichroic dye. This is because the Guest-Host type liquid crystal consumes little electric power and has a large field angle. If a reflective type display device using Guest-Host type liquid crystal is to present a picture with high contrast, it must have a reflective film with a white scattered surface. Hitherto, such a reflective film has been white metal film with small depressions, e.g. an aluminum film with small depressions. A few methods of forming such a white metal film are disclosed in Japanese Patent Disclosure No. 55-9517. They are:

(1) To sputter and deposit metal in an atmosphere under regulated conditions, e.g., temperature.
(2) To etch a white metal film, thus roughening the surface of the film.
(3) To roughen the surface of a white metal film by shot blasting These methods are disadvantageous. In any of these methods, small protrusions or depressions are formed directly on the surface of the reflective film. The edges of the protrusions or depressions thus formed inevitably have an acute angle. Light applied on the edge of each protrusion or depression will undergo multiple reflection and a portion of the light will be absorbed into the reflective film. Consequently, the reflective film will present a dark image.

SUMMARY OF THE INVENTION

It is an object of the invention to provide a reflective type liquid crystal display device which avoids the drawbacks described above and which displays bright images with high contrast, and to provide a method of manufacturing the device.

According to the invention, a reflective type liquid crystal display device is provided which is provided with a reflective part comprising a substrate, a polymer resin layer which is formed on the substrate and whose surface has small protrusions or depressions of a gently curved profile, and a reflective metal film which is formed on the polymer resin layer whose surface has small protrusions or depressions of a gently curved profile conforming to the surface profile of the polymer resin layer.

The substrate has either a flat surface or a surface with small protrusions or depressions. When the substrate has a flat surface, a polymer resin layer is formed on the substrate, a resist pattern is then formed on the polymer resin layer and the polymer resin layer is selectively etched, using the resist pattern as a mask, to have small protrusions or depressions in its surface. When the substrate has a surface with small protrusions or depressions, a polymer resin is coated on the substrate to become a polymer resin layer having small protrusions or depressions in its surface. A substrate having a surface with small protrusions or depressions may be formed by two alternative methods. The first method is to form a projection pattern on a flat surface of a substrate. The second method is to form a flattening layer on a rough surface of a substrate and then to form a projection pattern on the flattening layer.

According to the present invention, the reflective metal film is formed on that surface of the polymer resin layer which has small protrusions or depressions of a gently curved profile. The reflective metal film therefore has small protrusions or depressions of a gently curved profile in its surface. Light applied on any portion of the reflective metal film does not undergo multiple reflection and is not absorbed into the reflective metal film. Light incident on the liquid crystal display device of this invention is reflected from the reflective metal film to such a degree as is determined by the reflectivity of the metal forming the reflective film. The liquid crystal display device can therefore emit white scattered light and can thus display a very bright picture.

DETAILED DESCRIPTION OF THE PREFERRED EMBODIMENTS

Figure 1:
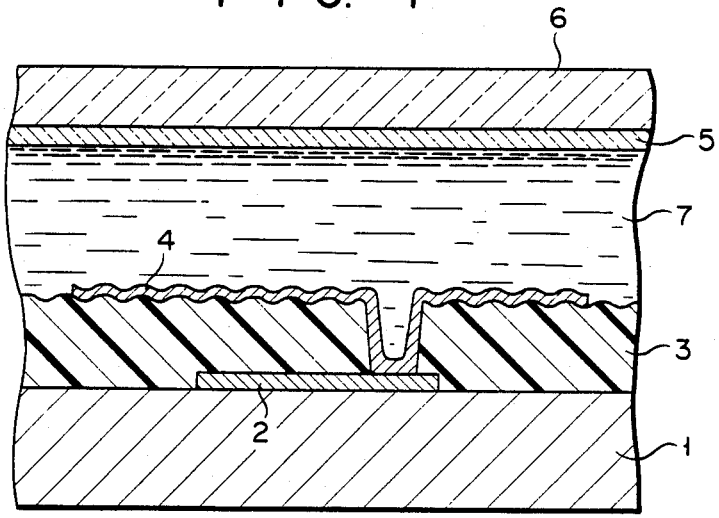
FIG. 1 is a sectional view of a liquid crystal display device, an embodiment of the invention.

As shown in FIG. 1, a liquid crystal display device according to the invention comprises a semiconductor substrate 1 and a metal wiring layer 2 formed on the substrate 1. The metal wiring layer 2 electrically connects elements (not shown) formed in the substrate 1 for driving the display device, such as transistors, resistors or capacitors. A polyimide resin layer 3 is coated on the semiconductor substrate 1. A display electrode 4 of aluminum, or a reflective film, is formed on the polyimide resin layer 3. The polyimide resin layer has an upper surface with small protrusions or depressions having a gently curved profile, and the display electrode 4 has an upper surface with small protrusions or depressions having a gently curved profile. The upper surface of the display electrode 4 therefore makes a white scattered surface. The device further comprises a transparent glass substrate 6 and a transparent conductive film 5 formed on the transparent substrate 6. A Guest-Host type liquid crystal 7 is filled in a gap between the display electrode 4 and the transparent conductive film 5.

Figure 2:
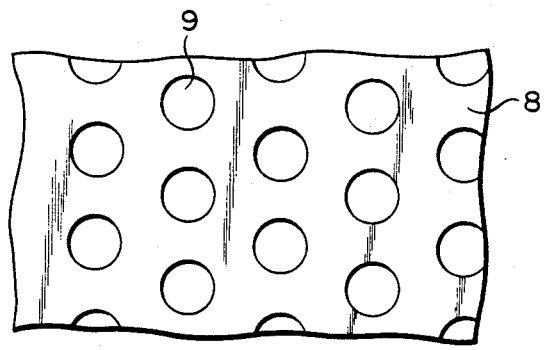
FIGS. 2 and 3 are plan views of two resist patterns which are used to manufacture the device shown in FIG. 1.
Figure 3:
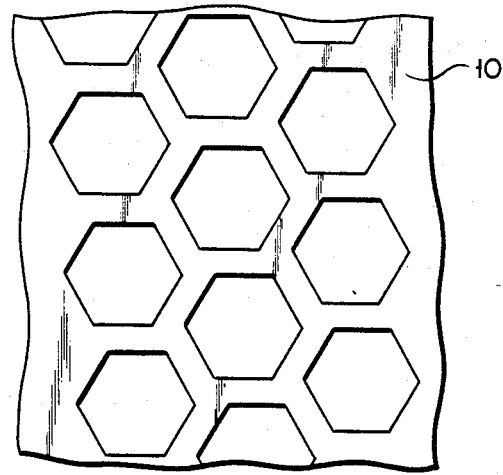

The display electrode 4 having a white scattered surface was formed in the following manner. First, Torenease SP-510 (manufactured by Toray Industries, Inc.), a polyimide resin, was spin-coated on the semiconductor substrate 1 at 3000 rpm for 30 seconds, with the elements already formed in it, thereby forming a polyimide resin layer 3. The polyimide resin layer 3 was heated first to 100° C. and then to 250° C., and was thus cured. A resist pattern 8 shown in FIG. 2 was then formed on the polyimide resin layer 3. The pattern 8 was of the negative type. As shown in FIG. 2, the pattern 8 has circular openings 9 cut at a pitch of 1 to 50 microns. It may be replaced by such a resist pattern 10 having hexagonal openings as shown in FIG. 3.

Figure 4:
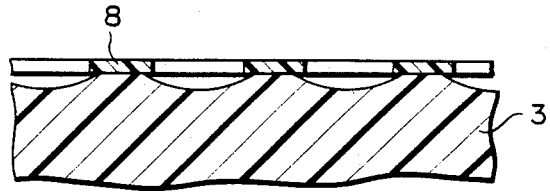
FIG. 4 is a sectional view of the resist pattern shown in FIG. 2.

Thereafter, using the resist pattern 8 as a mask, the resin layer 3 was etched by wet etching, employing a mixture of hydrazine and ethylene diamine as etchant, thereby forming depressions. As a result, the surface region of the resin layer 3 had a profile as illustrated in FIG. 4. Alternatively, small protrusions may be formed by etching the polyimide resin layer 3 using a spot-like resist pattern as a mask.

The resist pattern 8 was then removed from the resin layer 3. The resin layer 3 was heated to 150° C. to 500° C., preferably 350° C. The edges of the depressions were rounded, whereby the resin layer 3 came to have small depressions having a gentle curved profile.

Further, a contact hole was made in the resin layer 3 by photolithography. An aluminum film about 500 Å to 3000 Å thick, preferably about 2000 Å thick, was formed by vacuum deposition on the resin layer 3 and in the contact hole. The aluminum film may be replaced by another metal such as an aluminum alloy. The aluminum film was selectively etched by photolithography, to form a pattern corresponding to a pattern of a number of picture elements, only one of which is shown in FIG. 1. As a result, the display electrode 4 was completed.

The display electrode 4 thus formed had small depressions in its surface because the upper surface of the resin layer 3 also had small depressions. The electrode 4 therefore had a white scattered surface. In addition, the white scattered surface was a very bright one. This is because the depressions had a gently curved profile and light applied on them did not undergo multiple reflection.

The openings of the resist pattern must be arranged at a pitch of 1 to 50 microns. If they are arranged at a pitch of less than 1 micron, the display electrode 4 will have a mirror-like surface. Conversely, when they are arranged at a pitch of more than 50 microns, the display electrode 4 will fail to have a white scattered surface.

The depth of the depressions made in the polyimide resin layer 3 by etching the layer 3 using the resist pattern 8 as a mask, is determined by the optimal reflectivity which is desired for the display electrode 4. According to the invention, it is typically 0.1 to 5 microns. If the depth is less than 0.1 micron, the depressions of the display electrode 4 will fail to perform the function demanded of them. If the depth is more than 5 microns, an image formed on the liquid display device will be too dark.

In the embodiment described above, Torenease SP-510 is used as a polymer resin. Some other polyimide resins or some other thermosetting resins than polyimide resins may be used. Further, a thermoplastic resin such as silicone resin or fluorocarbon resin may be used. In short, any polymer resin can be used which contains few impurities, withstands the heat of metal deposition (e.g. 150° C. in case of aluminum deposition) and which can be coated. If a thermoplastic resin is used, no heat treatment is necessary for curing the resultant resin layer though heat treatment for forming a gently curved profile is necessary. If a thermosetting resin is used, it is desired that isotropic etching such as wet etching should be conducted on the resin layer to thereby form small protrusions or depressions having a gently curved profile. This is because the heat treatment that follows cannot fully round the edges of the protrusions or depressions made in the surface of the thermosetting resin layer. On the other hand, the resin layer, if made of a thermoplastic resin, may be subjected to anisotropic etching such as RIE, because the edges of the protrusions or depressions formed in the layer can be effectively rounded when the layer is heated. Further, a polymer resin layer which has been subjected to isotropic etching is not always heated, because the isotropic etching suffices to provide the layer with small protrusions or depressions having a gently curved profile.

A silver film may be used in place of the aluminum film.

Figure 5:
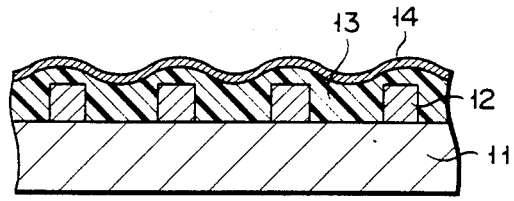
FIG. 5 is a sectional view of the reflective part of another liquid crystal display device according to the invention.

FIG. 5 shown another reflective part of the liquid crystal display device according to the invention. This reflective part comprises a substrate 11, a projection pattern 12 formed on the substrate 11, a polymer resin layer 13 formed on the substrate 11 and the projection pattern 12, and a reflective metal film 14 formed on the polymer resin layer 13. The layer 13 is made of polyimide resin or the like. The metal film 14 has a high reflectivity. The metal film 14 of the reflective part of this structure has a uniformly white scattered surface.

Figure 6A:
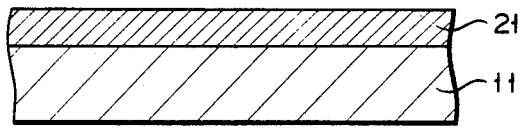
FIGS. 6A to 6C are sectional views illustrating how to manufacture the reflective part shown in FIG. 5.
Figure 6B:
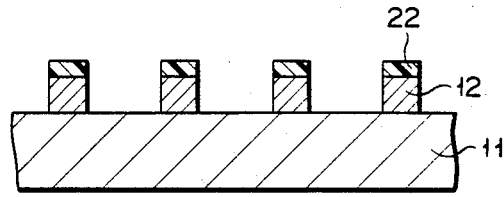
Figure 6C:
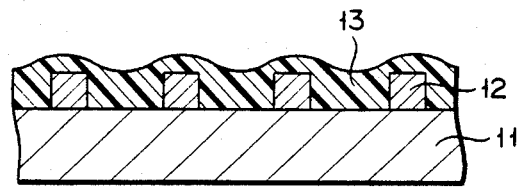

With reference to FIGS. 6A to 6C, it will now be described how the reflective part shown in FIG. 5 was manufactured.

First, as shown in FIG. 6A, a layer 21 made of insulating material, semiconductor material or metal, or consisting of two or more layers made of insulating material, semiconductor material or metal was formed on a substrate 11. The layer 21 was then selectively etched, using a mask pattern 22, thus forming a projection pattern 12 as shown in FIG. 6B.

The layer 21 may be formed by CVD, sputtering deposition, evaporation or spinner coating. To form the projection pattern 12, a method other than selective etching may be used. For example, a plating method of lift-off method may be employed.

The projection pattern 12 consists of a number of spot layers. Generally it is desired that the spot layers should be circular and should be arranged as densely as possible. Preferably, the spot layers should be arranged at a pitch of 1 to 50 microns and should be 0.1 to 10 microns thick. Alternatively, the projection pattern 12 may be a perforated layer having a number of circular openings.

If the layer 21 is selectively etched by anisotropic etching such as reactive ion etching, it can be made into a highly precise projection pattern 12. If reactive ion etching is conducted on the layer 21, using a proper etchant gas under proper pressure, a projection pattern will be formed which has inclined sides.

After the projection pattern 12 had been formed as described above, the mask pattern 22 was removed. Polymer resin such as polyimide resin having a predetermined viscosity was coated on the substrate 11 and the projection pattern 12 as shown in FIG. 6C, thereby forming a polymer resin layer 13.

The polymer resin may be coated by spin coating or vibration coating. If spin coating is used, the substrate 11 may be rotated by a spinner at, for example, 2000 to 5000 rpm. The spinning speed and the viscosity of the polymer resin may be changed to thereby form a polymer resin layer 13 having a desired profile.

Upon completion of the polymer resin layer 13, a metal layer 14 of a high reflectivity is formed on the polymer resin layer 13. The metal layer 14 may be made of aluminum, silver or an alloy thereof and may consist of two or more layers which are vapor-deposited one upon another. If the metal layer 14 has a multi-layer structure, the uppermost layer must have the highest reflectivity of all the layers.

The polymer resin layer had small protrusions or depressions having a gently curved profile over its entire surface. The edges of the protrusions or depressions of the metal layer 14 vapor-deposited on the polymer resin layer 13 have a gentle angle. Light applied on the metal layer 14 did not undergo multiple reflection.

Figure 7:
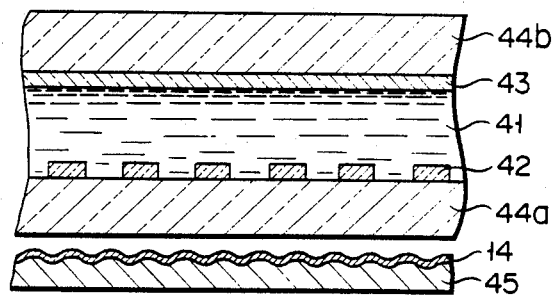
FIG. 7 is a sectional view of the device having the reflective part shown in FIG. 5.

The structure shown in FIG. 5 (hereinafter called the "reflective part") may be used to form such a liquid crystal display device as illustrated in FIG. 7.

In the liquid crystal display device of FIG. 7, the reflective part is used as a reflective plate. The device comprises a first glass substrate 44a, a plurality of transparent electrodes 42 arranged on the substrate 44a, a second glass substrate 44b, a transparent electrode 43 formed on the substrate 44b and a liquid crystal 41 filled in a gap between the first substrate 44a and the second substrate 44b. A reflective plate 45 which comprises a substrate and reflective film 14 formed on the entire surface of the substrate is positioned in the light path of the liquid crystal layer 41. The plate 45 corresponds to the reflective part shown in FIG. 5, though neither the projection pattern 12 nor the polymer resin layer 13 is shown in FIG. 7.

Figure 8:
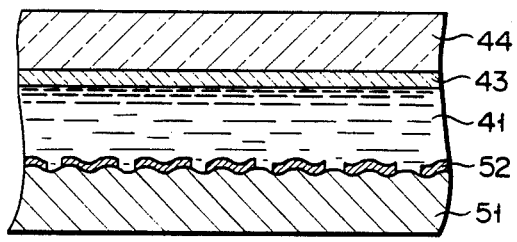
FIG. 8 is a sectional view of another liquid crystal display device having a reflective part similar to the part shown in FIG. 5.

FIG. 8 shows another liquid crystal display device having a reflective part similar to the part shown in FIG. 5. This device comprises a liquid crystal 41 filled in a gap between a transparent electrode 43 formed on a glass substrate 44 and another glass substrate 51. Metal strips or islands 52 are formed on the glass substrate 51. These metal strips or islands 14 function as both the reflective film and display electrodes.

Figure 9:
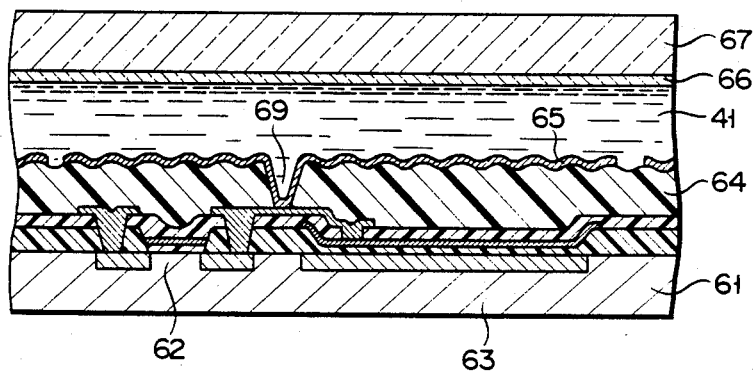
FIG. 9 is a sectional view of still another liquid crystal display device having a reflective part similar to the part shown in FIG. 5.

FIG. 9 illustrates a liquid crystal display device of an active matrix system which is formed on a semiconductor substrate 61 made of single-crystalline silicon. More specifically, switch/capacitor arrays of liquid crystal driving elements consisting of MOSFETs 62 and MOS capacitors (only one of the MOSFETs and only one of the MOS capacitors being shown) are integrated on the substrate 61. The array is covered with a polymer resin layer 64. Metal films 65 are formed on the polymer resin layer 64. Each of the metal films 65 functions as both a reflective film and a display electrode. The metal films 65 shown in FIG. 9 is electrically connected to the MOS capacitor 63 in a contact hole 69 cut in the polymer resin layer 64. A liquid crystal 41 is filled in a gap between the metal films 65 and a transparent electrode 66 formed on a glass substrate 67. The single-crystalline silicon substrate 61 may be replaced by an SOS substrate or a glass plate with a TFT film formed on it.

Figure 10A:
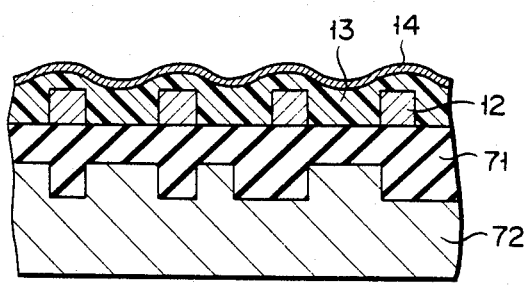
FIGS. 10A and 10B are sectional views of two projection patterns each formed on a substrate having a rough surface.
Figure 10B:
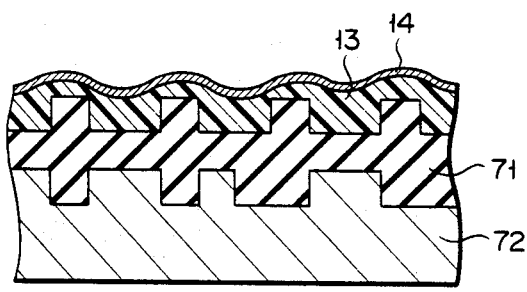

In order to form a metal reflective film with small protrusions or depressions having a gently curved profile using a projection pattern, the projection pattern may be formed on a flattening layer 71 formed on the rough surface of a substrate 72 as illustrated in FIG. 10A. In this case, a projection pattern 12 is formed on the flattening layer 71 which has a flat, smooth surface. Alternatively, a projection pattern may be formed by patterning the surface region of the flattening layer 71 as illustrated in FIG. 10B. Further, a projection pattern may be formed by patterning the surface region of the substrate 72.

What is claimed is:

1. A method for manufacturing a reflective type liquid crystal display device, comprising the steps of:
   forming a projection pattern on a substrate by selective etching using a mask pattern;
   forming a polymer resin layer on the projection pattern, said polymer resin layer having small protrusions and depressions in one surface, said protrusions and depressions having a gently curved profile and conforming with the projection pattern; and
   forming a reflective metal film on the polymer resin layer, said reflective metal film having small protrusions and depressions in one surface, said protrusions and depressions having a gently curved profile conforming with the surface profile of the polymer resin layer to produce a reflective part of the reflective type liquid crystal display device.

2. A method according to claim 1, wherein said polymer resin layer is made of thermosetting resin.

3. A method according to claim 2, wherein said substrate has uneven surface, a flattening layer is formed on the uneven surface of said substrate, a projection pattern is formed on the flattening layer, and the protrusions or depressions of said polymer resin layer conform to the projection pattern.

4. A method according to claim 1, wherein said thermosetting resin is polyimide resin.

5. A method according to claim 1, wherein said polymer resin layer is made of thermoplastic resin.

6. A method according to claim 1, wherein said thermoplastic resin is silicone resin or fluorocarbon resin.

7. A method according to claim 1, wherein said reflective metal film is made of metal selected from the group consisting of aluminum, aluminum alloy and silver.

8. A method according to claim 1, wherein said liquid crystal is a Guest-Host type liquid crystal.

9. A method according to claim 1, wherein said selective etching is performed until the surface of the substrate is exposed.

10. A method according to claim 1, wherein said selective etching is performed by reactive ion etching.

11. A method according to claim 1, wherein said polymer resin layer is formed by spin coating.

* * * * *